(12) United States Patent
Baldemair et al.

(10) Patent No.: US 12,335,019 B2
(45) Date of Patent: Jun. 17, 2025

(54) METHOD AND APPARATUS FOR ARRAY SIZE INVARIANT BEAMFORMING

(71) Applicant: Telefonaktiebolaget LM Ericsson (publ), Stockholm (SE)

(72) Inventors: Robert Baldemair, Solna (SE); Sven Petersson, Sävedalen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 4 days.

(21) Appl. No.: 18/260,565

(22) PCT Filed: Jan. 12, 2021

(86) PCT No.: PCT/SE2021/050013
§ 371 (c)(1),
(2) Date: Jul. 6, 2023

(87) PCT Pub. No.: WO2022/154699
PCT Pub. Date: Jul. 21, 2022

(65) Prior Publication Data
US 2024/0072879 A1 Feb. 29, 2024

(51) Int. Cl.
*H04B 7/10* (2017.01)
*H04B 7/0456* (2017.01)

(52) U.S. Cl.
CPC ............ *H04B 7/10* (2013.01); *H04B 7/0469* (2013.01)

(58) Field of Classification Search
CPC .................................. H04B 7/10; H04B 7/0469
See application file for complete search history.

(56) References Cited

U.S. PATENT DOCUMENTS

2019/0280748 A1 9/2019 Cirkic et al.
2020/0395664 A1* 12/2020 Athley ................. H04B 7/0617

FOREIGN PATENT DOCUMENTS

WO 2020214071 A1 10/2020

OTHER PUBLICATIONS

International Search Report and Written Opinion dated Oct. 1, 2021 for International Application No. PCT/SE2021/050013 filed Jan. 12, 2021, consisting of 12-pages.

(Continued)

*Primary Examiner* — Rahel Guarino
(74) *Attorney, Agent, or Firm* — Weisberg I.P. Law, P.A.

(57) ABSTRACT

Methods for transmitting a first signal x1 and a second signal x2 using a first array of antenna elements of a polarization A and a second array of antenna elements of a substantially orthogonal polarization B. The methods include transmitting x1 in a first beam generated with array size invariant beamforming, using a sub-array A1 of antenna elements from the first array and applying a first precoding matrix, and using a sub-array B1 of antenna elements from the second array and applying a second precoding matrix. The methods also include transmitting x2 in a second beam generated with array size invariant beamforming, using a sub-array A2 of antenna elements from the first array and applying a third precoding matrix, and using a sub-array B2 of antenna elements from the second array and applying a fourth precoding matrix. The sub-arrays within a polarization are typically non-overlapping.

20 Claims, 8 Drawing Sheets

---

| Transmitting the first signal in a first beam generated with array size invariant beamforming, using a sub-array A1 of antenna elements from the first array and applying a first precoding matrix, and using a sub-array B1 of antenna elements from the second array and applying a second precoding matrix | 610 |

| Transmitting the second signal x2 in a second beam generated with array size invariant beamforming wherein the second beam has a polarization substantially orthogonal to the polarization of the first beam, using a sub-array A2 of antenna elements from the first array and applying a third precoding matrix, and using a sub-array B2 of antenna elements from the second array and applying a fourth precoding matrix, wherein the sub-arrays A1 and A2 each comprises at least one antenna element not overlapping with the other sub-array in the pair of sub-arrays A1 and A2, and the sub-arrays B1 and B2 each comprises at least one antenna element not overlapping with the other sub-array in the pair of sub-arrays B1 and B2 | 620 |

(56) References Cited

OTHER PUBLICATIONS

S. O. Petersson et al.; Energy-Efficient Design of Broad Beams for Massive MIMO Systems; IEEE Transactions on Vehicular Technology, vol. 71, No. 11; Nov. 2022, consisting of 10-pages.

S. O. Petersson; Power-Efficient Beam Pattern Synthesis via Dual Polarization Beamforming; 2020 14th European Conference on Antennas and Propagation (EuCAP); Mar. 2020, consisting of 5-pages.

\* cited by examiner

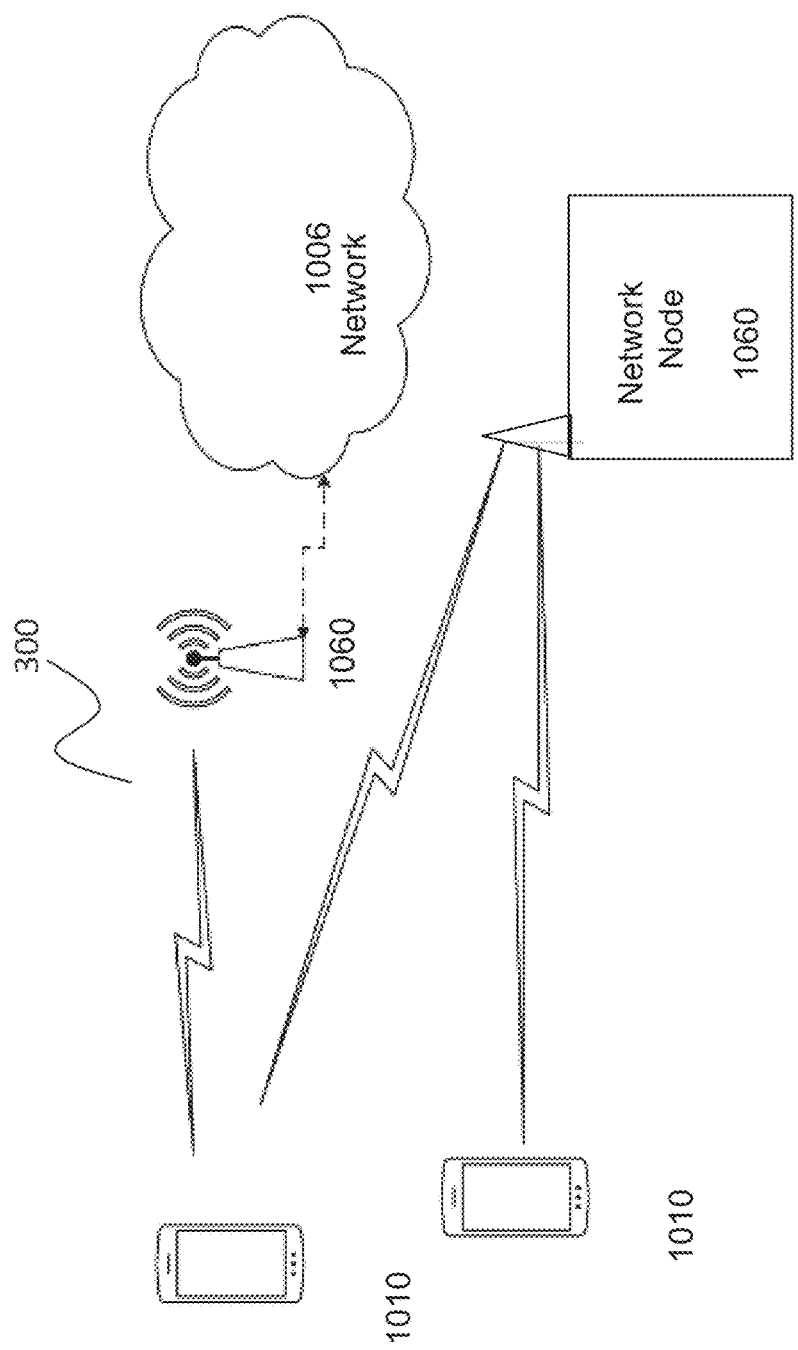

Array for Polarization A

| $x_1[W_{1,A}]_{1,1} + x_2[W_{2,A}]_{1,1}$ | $x_1[W_{1,A}]_{1,2} + x_2[W_{2,A}]_{1,2}$ |
|---|---|
| $x_1[W_{1,A}]_{2,1} + x_2[W_{2,A}]_{2,1}$ | $x_1[W_{1,A}]_{2,2} + x_2[W_{2,A}]_{2,2}$ |
| $x_1[W_{1,A}]_{3,1} + x_2[W_{2,A}]_{3,1}$ | $x_1[W_{1,A}]_{3,2} + x_2[W_{2,A}]_{3,2}$ |
| $x_1[W_{1,A}]_{4,1} + x_2[W_{2,A}]_{4,1}$ | $x_1[W_{1,A}]_{4,2} + x_2[W_{2,A}]_{4,2}$ |

Array for Polarization B

| $x_1[W_{1,B}]_{1,1} + x_2[W_{2,B}]_{1,1}$ | $x_1[W_{1,B}]_{1,2} + x_2[W_{2,B}]_{1,2}$ |
|---|---|
| $x_1[W_{1,B}]_{2,1} + x_2[W_{2,B}]_{2,1}$ | $x_1[W_{1,B}]_{2,2} + x_2[W_{2,B}]_{2,2}$ |
| $x_1[W_{1,B}]_{3,1} + x_2[W_{2,B}]_{3,1}$ | $x_1[W_{1,B}]_{3,2} + x_2[W_{2,B}]_{3,2}$ |
| $x_1[W_{1,B}]_{4,1} + x_2[W_{2,B}]_{4,1}$ | $x_1[W_{1,B}]_{4,2} + x_2[W_{2,B}]_{4,2}$ |

*FIG. 2 – Prior Art*

| Subarray 1 for Polarization A | | Subarray 1 for Polarization B | |
|---|---|---|---|
| $x_1[\widetilde{W}_{1,A}]_{1,1}$ | $x_1[\widetilde{W}_{1,A}]_{1,2}$ | $x_1[\widetilde{W}_{1,B}]_{1,1}$ | $x_1[\widetilde{W}_{1,B}]_{1,2}$ |
| $x_1[\widetilde{W}_{1,A}]_{2,1}$ | $x_1[\widetilde{W}_{1,A}]_{2,2}$ | $x_1[\widetilde{W}_{1,B}]_{2,1}$ | $x_1[\widetilde{W}_{1,B}]_{2,2}$ |

| Subarray 2 for Polarization A | | Subarray 2 for Polarization B | |
|---|---|---|---|
| $x_2[\widetilde{W}_{2,A}]_{1,1}$ | $x_2[\widetilde{W}_{2,A}]_{1,2}$ | $x_2[\widetilde{W}_{2,B}]_{1,1}$ | $x_2[\widetilde{W}_{2,B}]_{1,2}$ |
| $x_2[\widetilde{W}_{2,A}]_{2,1}$ | $x_2[\widetilde{W}_{2,A}]_{2,2}$ | $x_2[\widetilde{W}_{2,B}]_{2,1}$ | $x_2[\widetilde{W}_{2,B}]_{2,2}$ |

*FIG. 4*

| Transmitting the first signal in a first beam generated with array size invariant beamforming, using a sub-array A1 of antenna elements from the first array and applying a first precoding matrix, and using a sub-array B1 of antenna elements from the second array and applying a second precoding matrix | 610 |

↓

| Transmitting the second signal x2 in a second beam generated with array size invariant beamforming wherein the second beam has a polarization substantially orthogonal to the polarization of the first beam, using a sub-array A2 of antenna elements from the first array and applying a third precoding matrix, and using a sub-array B2 of antenna elements from the second array and applying a fourth precoding matrix, wherein the sub-arrays A1 and A2 each comprises at least one antenna element not overlapping with the other sub-array in the pair of sub-arrays A1 and A2, and the sub-arrays B1 and B2 each comprises at least one antenna element not overlapping with the other sub-array in the pair of sub-arrays B1 and B2 | 620 |

*FIG. 6*

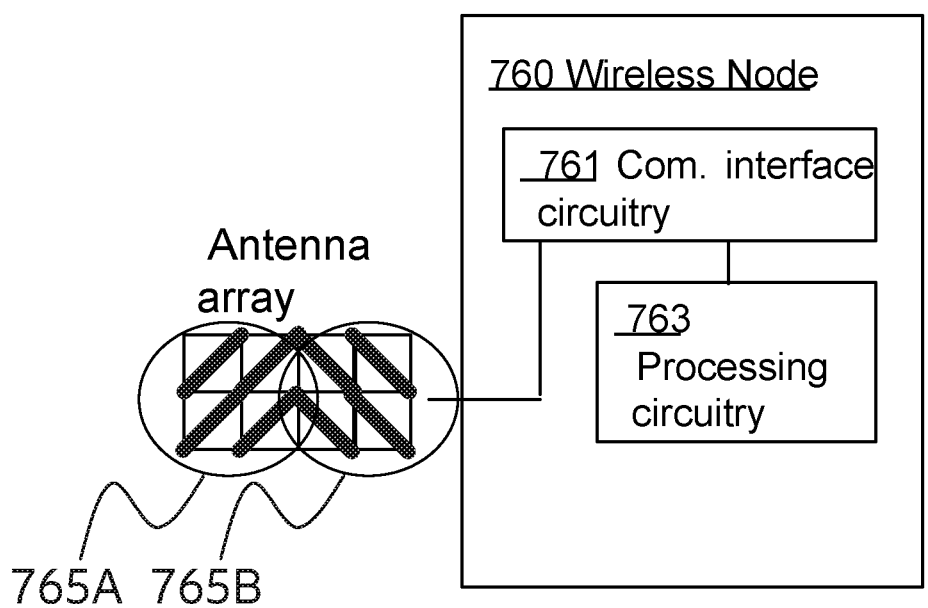

*FIG. 7A*

METHOD AND APPARATUS FOR ARRAY SIZE INVARIANT BEAMFORMING

TECHNICAL FIELD

CROSS-REFERENCE TO RELATED APPLICATIONS

This application is a Submission Under 35 U.S.C. § 371 for U.S. National Stage Patent Application of International Application Number: PCT/SE2021/050013, filed Jan. 12, 2021 entitled "METHOD AND APPARATUS FOR ARRAY SIZE INVARIANT BEAMFORMING," the entirety of which is incorporated herein by reference.

The present invention generally relates to beamforming in wireless communication networks, and particularly relates to array size invariant beamforming for single-carrier signaling by a wireless node.

BACKGROUND

Beamforming

Beamforming is a technique where a signal is transmitted with an antenna array consisting of multiple antenna elements. The phase of individual antenna elements or groups of antenna elements can be controlled, thus making it possible to steer the direction into which the signal is transmitted. This is referred to as the forming of a beam in which the signal is transmitted. In some beamforming systems, also the amplitude of individual antenna elements or groups of antenna elements can be set, which can be referred to as amplitude tapering. However, amplitude tapering leads to transmission with less than full power. Assuming an antenna array with a size of M rows and N columns (M×N) which may be referred to as a uniform rectangular array (URA), the signal applied to each antenna element of the beamforming network can be expressed as x·W, with W being the weight matrix and x being the signal applied. The weight matrix W has a size M×N and each element of the matrix contains phase shift values for the corresponding antenna element. The weight matrix elements may also comprise amplitude values in case of amplitude tapering. The weight matrix W is thus the tool for steering the signal transmission direction or beam. FIG. 1 is an illustration of a signal x beamformed through a weight matrix W for which element $W_{k,l}$ is applied to the antenna elements (k,l) of a 4×2 antenna array. The weight matrix W is sometimes referred to as a precoding matrix. The signal x is then said to be precoded by the precoding matrix W.

A beamforming system often comprises one or more antenna arrays of orthogonally polarized antenna elements, such as one antenna array of dual-polarized antenna elements (polarization A and B), or two antenna arrays, one with antenna elements of polarization A and the other with antenna elements of polarization B orthogonal to A. In these cases two precoding matrices, $W_A$ and $W_B$ for respective polarizations A and B exist. Signal $x_A$ is applied to the antenna elements of polarization A precoded by $W_A$, and signal $x_B$ is applied to the antenna elements of polarization B precoded by $W_B$. Signal $x_A$ and signal $x_B$ can be a same signal or different signals.

Array Size Invariant Beamforming

In order to create a wide beam or broad beam using an antenna array, a first alternative is to use a subset of antenna elements of the antenna array and a precoder providing only phase shifts. A second alternative is to use all antenna elements of the antenna array together with amplitude tapering. However, both these approaches are undesirable since they do not take advantage of the maximum possible output power of the antenna array. Often the power amplifier is placed behind each antenna element of the array. In the first alternative, not all antenna elements are used and therefore only a subset of the power amplifiers is utilized. In the second alternative, amplitude tapering is applied which results in that not all power amplifiers are fully utilized.

The articles "Power-Efficient Beam Pattern Synthesis via Dual Polarization Beamforming" (Sven O. Petersson, 14th European Conference on Antennas and Propagation (EuCAP), 2020) and "Energy-Efficient Design of Broad Beams for Massive MIMO Systems" (Sven O. Petersson, and Maksym A. Girnyk, Member, IEEE) both disclose a technique that creates wide beams in a beamforming system while still using all antenna elements of the antenna array and applying only phase shifts and not amplitude tapering to the individual antenna elements. This technique may be referred to as array size invariant beamforming, and is also the terminology used herein. The reason for calling it array size invariant beamforming is that the beam formed using this technique will have a certain width that is independent of the number of antenna elements that is used for the beamforming—the beamforming is thus invariant with regards to the array size used. The beam that is formed is referred to as a wide beam, as it is wider than a Discrete Fourier Transform (DFT) beam generated with the same number of antenna elements. Array size invariant beamforming is an important tool to create wide beams while utilizing all antenna elements with maximum power, i.e. to create wide beams with full transmit power. According to the array size invariant beamforming technique described in the referenced articles, one or more antenna arrays which together provide sets of orthogonally polarized antenna elements with similar power patterns are needed to create a wide beam. Signal $x_1$ is transmitted using antenna elements of both polarizations A and B, with precoding matrices $W_{1,A} = u_{1,A}v_{1,\alpha}^T - Ju^*_{1,B}v_{1,\beta}^T$ for polarization A, and $W_{1,B} = u_{1,B}v_{1,\alpha}^T + Ju^*_{1,A}v_{1,\beta}^T$ for polarization B.

J is a permutation matrix which reverses the elements in a vector. $u_{1,A}$ and $u_{1,B}$ are beamforming vectors for elevation steering, $v_{1,\alpha}$ and $v_{1,\beta}$ are beamforming vectors for azimuth steering. This will have the effect that the signal $x_1$ is transmitted in a wide beam for which each direction has a specific polarization.

If an overlapping second wide beam is to be created orthogonally polarized to the first beam (and thus not interfering with the first beam) to transmit a second signal $x_2$ (e.g. for the purpose of spatial multiplexing or transmit diversity), the signal $x_2$ is to be transmitted using antenna elements of both polarizations A and B, with precoding matrices $W_{2,A} = -J_M W^*_{1,B} J_N$ for polarization A, and $W_{2,B} = J_M W^*_{1,A} J_N$ for polarization B.

$J_M$ and $J_N$ are permutation matrices which reverse elements in a vector, of size M×M and N×N, respectively. To transmit both signals $x_1$ and $x_2$, antenna element (k,l) of the one or more antenna arrays with polarization A is fed with $x_1[W_{1,A}]_{k,l} + x_2[W_{2,A}]_{k,l}$ and antenna element (k,l) of array with polarization B is fed with $x_1[W_{1,B}]_{k,l} + x_2[W_{2,B}]_{k,l}.$ FIG. 2 illustrates one example of transmission of signals $x_1$ and $x_2$ beamformed through precoding matrices as described above and applied to the antenna elements (k,l) of two antenna arrays with polarizations A and B respectively. The antenna arrays and in this case also the matrices $W_{1,A}$, $W_{2,A}$, $W_{1,B}$, and $W_{2,B}$ have 4 rows and 2 columns.

Single-Carrier Signaling

A single-carrier signal is not composed by a superposition of individual signals as the multi-carrier signal is. Rather, and as the name suggests, a single-carrier signal is made up of one single sequence of modulation symbols. The Peak to Average Power Ratio (PAPR) is determined by the property of the modulation symbols (e.g. the signaling alphabet such as pi/2-Binary Phase Shift Keying (BPSK), BPSK, Quadrature Phase Shift Keying (QPSK), 16 Quadrature Amplitude Modulation (16QAM)) and also by the filtering applied to the sequence of modulation symbols. A steep filter has a long impulse response such that contributions of neighboring modulation symbols can overlap thus resulting in increased PAPR. Nevertheless, a single-carrier signal has lower PAPR than a multi-carrier signal. Low PAPR of a signal is advantageous since less power back-off of the power amplifier is required when the signal is applied to it. The power amplifier can thus deliver a higher output power and the power efficiency of the power amplifier is increased. Common examples of single-carrier signals are Discrete Fourier Transform Spread (DFTS) Orthogonal Frequency Division Multiplex (OFDM) signals and Single-carrier—Frequency Domain Equalization (SC-FDE) signals.

Problems of Existing Solutions

For large antenna arrays—especially at higher frequencies—a common building practice is that a power amplifier is located behind each antenna element. If this power amplifier is fed with a waveform with high PAPR, the power amplifier must operate with a higher power back-off which results in lower output power and efficiency as already explained above.

As described in the previous section, individual antenna elements of the antenna arrays are fed with a superposition of two signals $x_1$ and $x_2$ when using conventional antenna array selection for array size invariant beamforming. This is not a problem if $x_1$ and $x_2$ are already high PAPR signals such as multi-carrier signals, since the superposition does not relatively increase PAPR much. However, if $x_1$ and $x_2$ are single-carrier waveforms with low PAPR, the superposition of $x_1$ and $x_2$ is no longer single-carrier and consequently has higher PAPR. There is therefore a need for an improved array size invariant beamforming solution for single-carrier signals.

SUMMARY

Certain aspects of the present disclosure and their embodiments may provide solutions to these or other challenges. For example, according to certain embodiments, a beamforming technique for generating beams using the above described array size invariant beamforming is used for transmitting two signals $x_1$ and $x_2$ in respective orthogonal wide beams. However, antenna elements used to transmit the signal $x_1$ via a first wide beam are not reused for transmitting the signal $x_2$ via a second wide beam which is orthogonally polarized to the first wide beam.

According to a first aspect, a method performed by a wireless node of a wireless communication system for transmitting a first signal x1 and a second signal x2 using a first array of antenna elements of a polarization A and a second array of antenna elements of a polarization B is provided. Polarization B is substantially orthogonal to the polarization A, and a power pattern of the antenna elements of the first array is substantially the same as a power pattern of the antenna elements of the second array. The method comprises transmitting the first signal x1 in a first beam generated with array size invariant beamforming, using a sub-array A1 of antenna elements from the first array and applying a first precoding matrix, and using a sub-array B1 of antenna elements from the second array and applying a second precoding matrix. The method further comprises transmitting the second signal x2 in a second beam generated with array size invariant beamforming. The second beam has a polarization substantially orthogonal to the polarization of the first beam. The second signal x2 is transmitted in the second beam using a sub-array A2 of antenna elements from the first array and applying a third precoding matrix, and using a sub-array B2 of antenna elements from the second array and applying a fourth precoding matrix. The sub-arrays A1 and A2 each comprises at least one antenna element not overlapping with the other sub-array in the pair of sub-arrays A1 and A2, and the sub-arrays B1 and B2 each comprises at least one antenna element not overlapping with the other sub-array in the pair of sub-arrays B1 and B2.

According to a second aspect a wireless node configured to perform the method according to the first aspect, or other exemplary methods described herein, is provided.

According to further aspects, a computer program and a carrier such as a non-transitory computer readable storage medium containing or storing the computer program are provided. The computer program comprises instructions that, when executed by at least one processor of a wireless node, causes the wireless node to perform operations corresponding to the exemplary methods described herein.

Certain embodiments may provide one or more of the following technical advantages. One technical advantage may be that a superposition of signals at the antenna elements is avoided. A further technical advantage may be that array size invariant beamforming can be used to create two orthogonally polarized wide beams while maintaining the low PAPR of the waveform of transmitted single-carrier signals at the input of the power amplifiers. Orthogonally polarized wide beams are advantageous for, e.g., spatial multiplexing and transmit diversity. Another technical advantage may be that large power back-off of the power amplifier is avoided, which results in higher output power and power efficiency. These and other objects, features and advantages of the exemplary embodiments of the present disclosure will become apparent upon reading the following detailed description of the exemplary embodiments of the present disclosure.

The above and other aspects and embodiments are described below with reference to the accompanying drawings.

BRIEF DESCRIPTION OF THE DRAWINGS

FIG. 1 is a schematic illustration of a signal x beamformed through a weight or precoding matrix $W_{k,l}$, applied to the antenna elements (k,l) according to prior art.

FIG. 2 is a schematic illustration of signals $x_1$ and $x_2$ beamformed using array size invariant beamforming technique according to prior art.

FIG. 3 is a schematic illustration of an exemplifying wireless communications system in which embodiments herein may be implemented.

FIG. 4 is a schematic illustration of signals $x_1$ and $x_2$ beamformed using array size invariant beamforming technique according to embodiments of the invention.

FIG. 6 is a flowchart schematically illustrating the method or procedure according to embodiments.

FIGS. 7A and 7B are block diagrams illustrating a wireless node in accordance with some embodiments.

DETAILED DESCRIPTION

Figure 5A:
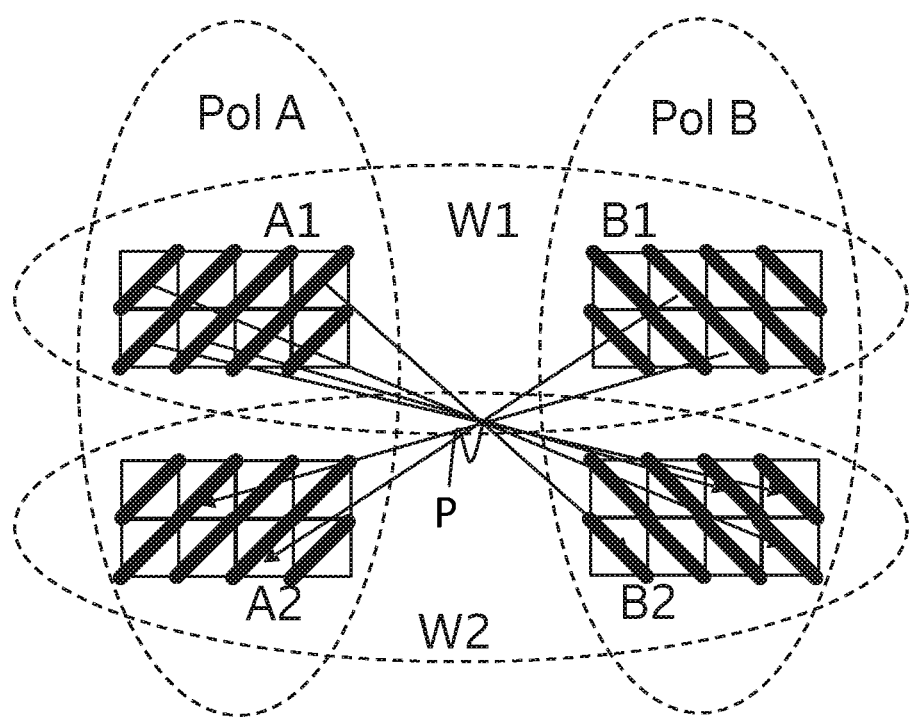
FIGS. 5A-C are schematic illustrations of different possible sub-array arrangements according to embodiments.

FIG. 3 is a schematic illustration of an exemplifying wireless communications system 300 in which embodiments herein may be implemented. Although the subject matter described herein may be implemented in any appropriate type of system using any suitable components, the embodiments disclosed herein are described in relation to a wireless communications system, such as the example wireless communications system 300 illustrated in FIG. 3. For simplicity, the wireless communications system 300 of FIG. 3 only depicts a network 1006, and wireless nodes such as network nodes 1060, and wireless devices or user equipment (UE) 1010. In practice, a wireless communications system may further include additional elements suitable to support communication between wireless devices or between a wireless device and another communication device, such as a landline telephone, a service provider, or any other network node or end device. Of the illustrated components, the wireless nodes comprising the network node 1060 and the wireless device 1010 are depicted with additional detail below. The wireless communications system may provide communication and other types of services to one or more wireless devices to facilitate the wireless devices' access to and/or use of the services provided by, or via, the wireless communications system.

The wireless communications system may comprise and/or interface with any type of communication, telecommunication, data, cellular, and/or radio network or other similar type of system. In some embodiments, the wireless communications system may be configured to operate according to specific standards or other types of predefined rules or procedures. Thus, particular embodiments of the wireless communications system may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and wireless device 1010 could both be referred to as wireless nodes 760 and comprise various components. These components work together in order to provide network node and/or wireless device functionality, such as providing wireless connections in a wireless communications system. In different embodiments, the wireless communications system may comprise any number of wired or wireless networks, network nodes, base stations, controllers, wireless devices, relay stations, and/or any other components or systems that may facilitate or participate in the communication of data and/or signals whether via wired or wireless connections.

Embodiments of this disclosure are important for single-carrier signaling since the waveforms of single-carrier signals typically have low PAPR, and it is important to maintain this property at the input of the power amplifier to avoid power back-off.

In embodiments, the data signals transmitted in orthogonally polarized beams are transmitted using separate antenna elements of an array when using array size invariant beamforming. In this way, a superposition of signals at the antenna elements—which would increase the PAPR—is avoided. Required power back-off for the power amplifier is reduced compared to the conventional way of using antenna elements when performing array size invariant beamforming. This results in higher output power and better power efficiency.

In one embodiment of a beamforming system, there are two uniform rectangular arrays (URAs), each of size M×N antenna elements, one first array for polarization A and one second array for polarization B. In one embodiment, each array is partitioned into two non-overlapping groups or sub-arrays of antenna elements. However, partially overlapping groups or sub-arrays of antenna element may be used in other embodiments. In a preferred embodiment the sub-arrays are of similar size. The first sub-array of polarization A is used to transmit signal $x_1$, and the second sub-array of polarization A is used to transmit signal $x_2$. The same applies for first and second sub-arrays of polarization B. The first sub-array of polarization B is thus used to transmit signal $x_1$, and the second sub-array of polarization B is used to transmit signal $x_2$.

FIG. 4 is an illustration of one example embodiment. The precoding matrices $\widetilde{W}_{1,A}$, $\widetilde{W}_{2,A}$, $\widetilde{W}_{1,B}$, and $\widetilde{W}_{2,B}$ used in the example embodiment in FIG. 4 correspond to the precoding matrices $W_{1,A}$, $W_{2,A}$, $W_{1,B}$, and $W_{2,B}$ already described above with reference to FIG. 2, although adopted to the smaller sub-array sizes. This means that the precoding matrices $\widetilde{W}_{1,A}$, $\widetilde{W}_{2,A}$, $\widetilde{W}_{1,B}$, and $\widetilde{W}_{2,B}$ are designed to—using array size invariant beamforming—create similar beam shapes and directions as the wide beams created using precoding matrices $W_{1,A}$, $W_{2,A}$, $W_{1,B}$, and $W_{2,B}$, although using only half of the antenna elements. Embodiments of the invention is not limited to the use of half of the antenna elements for the sub-arrays as will be described further below. Using fewer antenna elements to transmit each signal will reduce the maximum achievable beamforming gain, as the beamforming gain is proportional to the array size in number of antenna elements. The beamforming gain determines the beam width, and the larger the array size is the narrower the beams can be. However, since the array size invariant beamforming of the current solution generates a wide beam, using smaller sub-arrays when transmitting will not be a disadvantage.

In the example embodiment of FIG. 4, the antenna arrays of size M×N (4×2) corresponding to the precoding matrices $W_{1,A}$, $W_{2,A}$, $W_{1,B}$, and $W_{2,B}$ from FIG. 2, have been split into sub-arrays of $$\text{size } \frac{M}{2} \times N \ (2 \times 2).$$

In this example embodiment the precoding matrices $\widetilde{W}_{1,A}$, $\widetilde{W}_{2,A}$, $\widetilde{W}_{1,B}$, and $\widetilde{W}_{2,B}$ also have the $$\text{size } \frac{M}{2} \times N.$$

However, according to alternative embodiments, the precoding matrices need not always have the same size as the antenna arrays. In one example embodiment, this may be accomplished be setting some of the elements in the precoding matrix to zero.

As can be seen from FIG. 4, each antenna element (k,l) of a sub-array is only fed with a signal of the form $x_i[\widetilde{W}]_{k,l}$, where $x_i$ is one of the signals $x_1$ or $x_2$, and $\widetilde{W}$ is any of the precoding matrices $\widetilde{W}_{1,A}$, $\widetilde{W}_{2,A}$, $\widetilde{W}_{1,B}$, and $\widetilde{W}_{2,B}$. There is thus no superposition of the signals $x_1$ or $x_2$ at any of the antenna elements. The power amplifier located behind antenna element (k,l) is thus fed with $x_i[\widetilde{W}]_{k,l}$, and if $x_i$ is a single-carrier signal with low PAPR, also the input signal to the power amplifier will be a single-carrier signal with low PAPR.

In the example embodiment of FIG. 4, the sub-arrays are selected to have two rows and two columns of antenna elements each. However, depending on the original antenna panels available to the wireless node 760 for transmitting the signals $x_1$ and $x_2$, other sub-array selections may be possible as will be described with reference to FIGS. 5A-C.

FIG. 5A is a schematic illustration of an embodiment when 2×4 sub-arrays are chosen for polarization A and for polarization B. In this example embodiment, the precoders $W_2 = [W_{2A} \; W_{2B}]$ for forming the second beam apply for the typical case where the sub-arrays of both polarizations A and B (A1 and B1) used to create a first beam applying precoders $W_1 = [W_{1A} \; W_{1B}]$ are URAs of the same size and topology, similar to the example embodiment of FIG. 4. As already described with reference to FIG. 2 illustrating the array size invariant beamforming technique, $W_{2A} = -J_M W^*_{1B} J_N$ and $W_{2B} = J_M W^*_{1A} J_N$, where $J_M$ and $J_N$ are the permutation matrices used to provide the needed order of rows and columns in the corresponding precoding matrices.

Figure 5B:
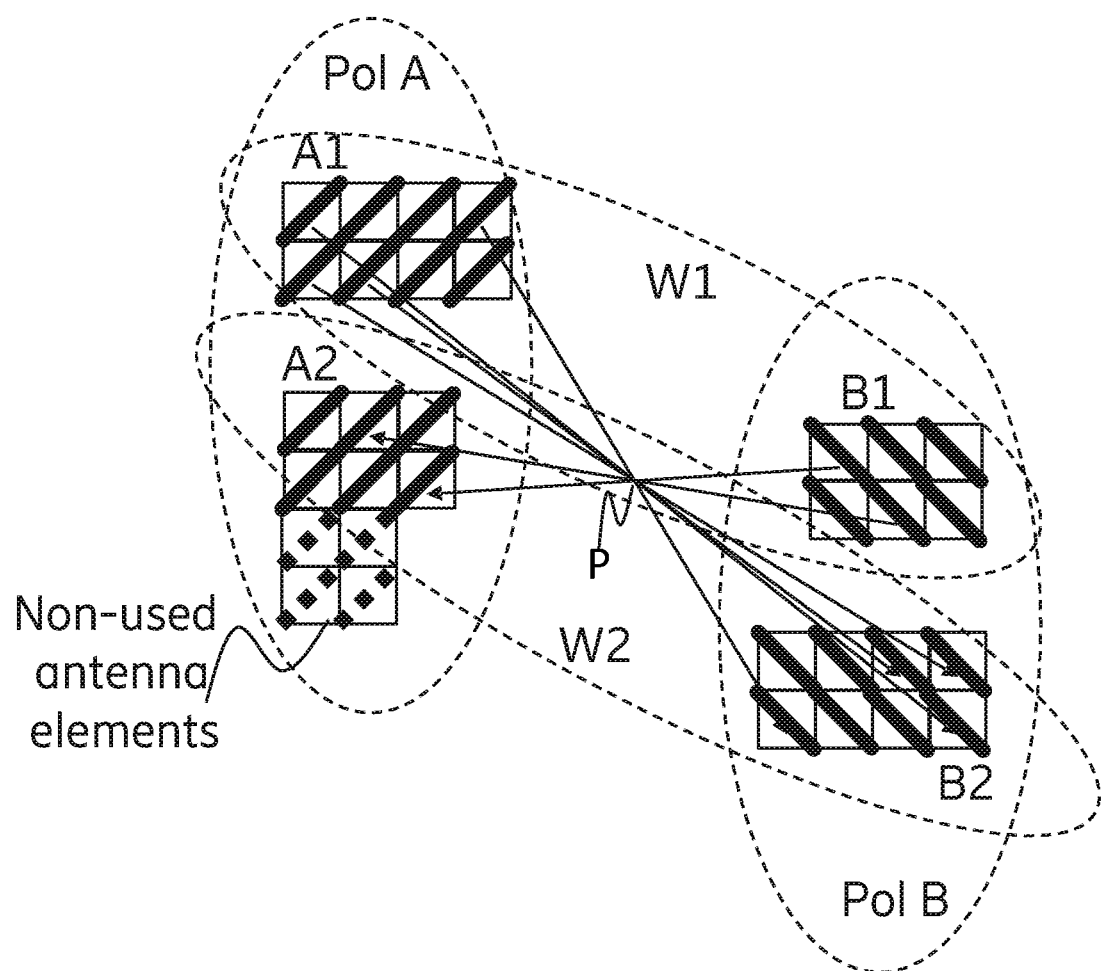
Figure 5C:
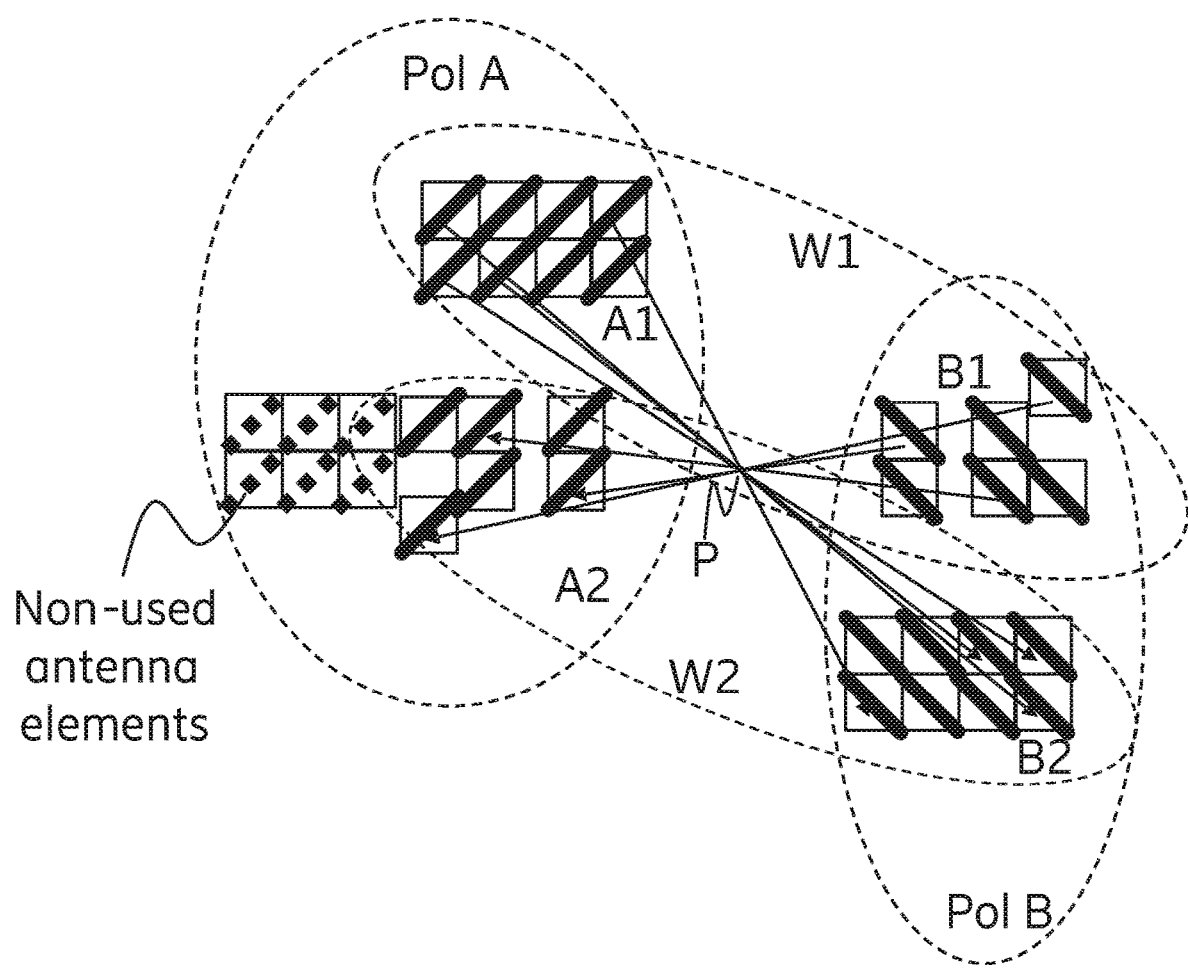

The equations above used for determining the precoding matrices $W_{2A}$ and $W_{2B}$ apply for the typical case illustrated in FIG. 5A. However, they cannot be applied for the general case such as the cases illustrated in FIGS. 5B and 5C. As one example, in FIG. 5B the number of columns is different for A1 and B1 which means that there cannot be a single matrix $J_N$. Hereinafter, a procedure for how to define the second beam in a general case is described, given a first beam defined by precoding matrices $W_{1A}$ and $W_{1B}$ applied to a first set of antenna elements comprising sub-array A1 and B1. In order for the power patterns for the first and the second beams to be equal, and for the polarizations of the generated beams to be orthogonal in all directions, the second beam may be defined according to the following:

The positions of antenna elements of the sub-arrays A2 and B2 used to form the second beam, can be found by mirroring all positions of the antenna elements of the sub-arrays used to form the first beam, for both polarizations A and B, in a point P (illustrated by arrows from antenna elements in W1 to antenna elements in W2 in FIGS. 5A-C going through point P);

The antenna elements of W2 in the mirrored positions, shall have orthogonal polarization to the corresponding antenna element in W1;

The complex conjugate of the precoder applied to an antenna element in W1 is applied to the mirrored antenna element in W2;

A phase shift of $\pi$ is introduced between the polarizations of W2, e.g., by changing the sign for all precoding weights applied to polarization A antenna elements.

The assumptions are that the antenna arrays used for creating the first and second beams are uniform linear arrays (ULAs) or uniform rectangular arrays (URAs), and that the precoders are arranged such that the position of an antenna element in the precoding vector, or matrix, correspond to the physical location of the antenna element in the array to which the precoding weight will be applied. When these assumptions are fulfilled, the operation of mirroring in a point P corresponds to reversing the row and column orders of the precoding matrix, and then applying a complex conjugate to the precoders for W1. Further, a phase shift of $\pi$ is added between the polarizations of W2 for the second beam. The precoding matrix $W_{2A}$ of the second beam is based on manipulations of the precoding matrix $W_{1B}$ of the first beam, and the precoding matrix $W_{2B}$ is based on manipulations of the precoding matrix $W_{1A}$.

FIGS. 5B and 5C illustrate some embodiments of possible ways to select sub-arrays differently from the typical case illustrated in FIG. 5A. FIG. 5B illustrates an embodiment with different sizes of the sub-arrays A1 and B1 used for the respective two polarizations of antenna elements in W1. It is thus not required that the number of antenna elements in the sub-array A1 of polarization A, to which the precoding matrix $W_{1A}$ is applied, is the same as the number of antenna elements in the sub-array B1 of polarization B, to which the precoding matrix $W_{1B}$ is applied. However, the positions of the antenna elements in the sub-arrays A2 and B2, to which $W_{2A}$ and $W_{2B}$ are applied, are found by mirroring the positions of the antenna elements in the sub-arrays B1 and A1 respectively in point P as described above. FIG. 5C illustrates an embodiment with different sizes and topologies of the sub-arrays A1 and B1 used for the respective two polarizations of antenna elements in W1, and how the mirroring in point P gives the positions of the sub-arrays A2 and B2 for antenna elements in W2. The sub-arrays used in W2 are thus related to the sub-arrays used in W1 in terms of size and topology. Further, FIGS. 5B and 5C illustrate some non-used antenna elements, i.e., non-excited antenna elements to which no power is applied. Such non-used antenna elements of an array will not have any effect on the solution.

As already mentioned above, a typical embodiment is when the original antenna panels or antenna arrays for polarization A and B are of equal sizes, i.e. the number of antenna elements of polarization A is equal to the number of antenna elements of polarization B. Further, the two respective antenna arrays are "split" into two non-overlapping parts or sub-arrays of equal size, i.e. half of the antenna elements correspond to the first sub-array and the other half correspond to the second sub-array. However, in practical applications some deviations from the above mentioned guidelines for the optimal embodiment would still result in a working embodiment. Some examples have been given above with reference to FIGS. 5A-C, and further examples are given hereinafter.

Typically, large antenna arrays with many antenna elements are deployed for high frequency systems, e.g. 64, 128, or maybe even 512 antenna elements or more in an antenna array. In embodiments, if antenna arrays for the two polarizations A and B have slightly different sizes they still can generate complementing beam shapes with substantially orthogonal beams, where the power capability of both antenna arrays may still be similar.

Further, in embodiments, an antenna array for one or both of the polarizations A and B may be divided into two non-overlapping sub-arrays of somewhat different sizes. The sub-arrays may still have similar power capabilities and a capability to generate similar beams.

In embodiments, some antenna elements may be shared between sub-arrays of a polarization, i.e., the antenna elements are used in both sub-arrays. The sub-arrays may thus have partly overlapping antenna elements. In one embodiment, a majority of antenna elements are non-overlapping. In a further embodiment, the sub-arrays are substantially non-overlapping. The waveform fed into the power amplifier associated with a shared antenna element would be a superposition of waveforms, i.e., the PAPR may be somewhat higher than with completely non-overlapping sub-arrays.

Assuming that all antenna elements are fed with a same signal amplitude and that all power amplifiers are identical, the desired effect of two orthogonal wide beams is best achieved with completely non-overlapping sub-arrays of a polarization. However, an example embodiment where a signal is fed to antenna elements with non-uniform amplitude is possible, and in this case partly overlapping antenna elements where the overlap is among antenna elements that are fed with a lower signal amplitude would not affect the resulting beamforming extensively.

In order to theoretically get the orthogonally polarized wide beams for the transmission of the two signals, it is required that the topology for the sub-arrays used for the respective two signals are related and correspond to each other as explained above. This means for example that if the sub-arrays for the polarization A are partially overlapping, then there must also be a same partial overlap between the sub-arrays for the polarization B. However, smaller deviations from the rules for how the sub-arrays used for the respective two signals shall be related may be acceptable, as the related performance degradation will be minor or in a same range of order as performance degradation resulting from other imperfections, e.g. with regards to not perfectly orthogonal antenna element polarizations.

Furthermore, in embodiments, the original antenna arrays for polarization A and B can be organized in antenna array panels in different ways. What is described as a first array of antenna elements of polarization A and a second array of antenna elements of polarization B, where polarization B is substantially orthogonal to the polarization A, may thus in example embodiments correspond to one of the following:

1. One antenna array panel with dual-polarized antenna elements, i.e two antenna elements with orthogonal polarizations A and B in a same location of the array. In this case the first array is defined by the antenna elements of the panel with polarization A and the second array is defined by antenna elements with polarization B.
2. A special case of the above is an antenna array panel with cross-polarized antenna elements. However, any type of polarization is possible as long as there are two sets of orthogonally polarized antenna elements.
3. Two separate antenna array panels with respective polarizations A and B orthogonal to each other, i.e two antenna elements with orthogonal polarizations A and B are not in a same physical location.
4. The number of physical antenna array panels is of less importance. As an example, the dual-polarized single antenna array described in the first bullet may be replaced by a plurality of antenna array panels with dual-polarized orthogonal antenna elements, e.g. placed side by side.

As already described above, the antenna arrays used for the two polarizations A and B may be substantially the same with regards to their topology. One such example embodiment is the one described with reference to FIG. 5A. When it comes to the physical distance between antenna elements, antenna element separation may be different along the two directions of the array but may be constant per direction. Further, the antenna arrays for the two polarizations may only be translated relative each other and not rotated. This translation may be implemented through the mirroring operation described previously in this typical example embodiment with URA antenna arrays illustrated in FIG. 5A.

Power radiation patterns, here simply referred to as power patterns, for the antenna elements of the two polarizations are expected to be substantially the same. Further, the polarizations A and B are expected to be substantially orthogonal. If the power patterns are not perfectly the same or if the polarizations are not perfectly orthogonal, the beam shapes generated by the antenna arrays according to embodiments will not be perfect in all directions. However, even if the resulting beamforming may differ with regards to what is theoretically possible, the result will still provide the above mentioned technical advantages although possibly to a different degree.

In embodiments, it is described how a first signal x1 may be transmitted in a first wide beam, and a second signal x2 may be transmitted in a second wide beam with a polarization substantially orthogonal to the polarization of the first wide beam. These two wide beams are generated using the array size invariant beamforming technique described in the background section, although with another selection of antenna elements from the orthogonally polarized antenna arrays than the conventional array size invariant beamforming, and with precoders adapted to this other selection of antenna elements, as described with reference to FIG. 4. The shape of the two wide beam's power patterns are substantially the same in a plurality of directions, and the two beams have substantially orthogonal polarizations with respect to each other in all of these plurality of directions, although the polarizations may differ between the directions.

It is understood that expressions such as for example "equal", "same", and "orthogonal" should not only be interpreted as being mathematically exact, but within what is practically obtainable in this field of technology.

FIG. 6 is a flowchart schematically illustrating the method according to embodiments. The method is performed by a wireless node of a wireless communication system for transmitting a first signal x1 and a second signal x2 using a first array of antenna elements of a polarization A and a second array of antenna elements of a polarization B. Polarization B is substantially orthogonal to the polarization A, and a power pattern of the antenna elements of the first array is substantially the same as a power pattern of the antenna elements of the second array. In embodiments, the wireless node corresponds to a network node 1060 such as a gNB of an NR system with antenna arrays of two polarizations communicating wirelessly with a UE 1010, and transmitting signal x1 and x2 to the UE in orthogonally polarized beams for the purpose of spatial multiplexing or transmit diversity. In other embodiments, the wireless node may be the UE 1010 transmitting in uplink to the gNB. This requires that the UE has a multiple antenna element array for its uplink transmissions. Although FIG. 6 shows blocks (corresponding to method steps or operations) in a particular order, this order is merely exemplary, and the operations of the exemplary method can be performed in a different order than shown and can be combined and/or divided into blocks having different functionality. The method comprises:

- 610: Transmitting the first signal x1 in a first beam generated with array size invariant beamforming, using a sub-array A1 of antenna elements from the first array and applying a first precoding matrix, and using a sub-array B1 of antenna elements from the second array and applying a second precoding matrix. In the example embodiment described with reference to FIG. 4, the first precoding matrix corresponds to $\widetilde{W}_{1,A}$ and the second precoding matrix corresponds to $\widetilde{W}_{1,B}$.
- 620: Transmitting the second signal x2 in a second beam generated with array size invariant beamforming wherein the second beam has a polarization substantially orthogonal to the polarization of the first beam, using a sub-array A2 of antenna elements from the first array and applying a third precoding matrix, and using a sub-array B2 of antenna elements from the second array and applying a fourth precoding matrix. In the example embodiment described with reference to FIG. 4, the third precoding matrix corresponds to $\widetilde{W}_{2,A}$ and the second precoding matrix corresponds to $\widetilde{W}_{2,B}$.

The sub-arrays A1 and A2 each comprises at least one antenna element not overlapping with the other sub-array in the pair of sub-arrays A1 and A2, and the sub-arrays B1 and B2 each comprises at least one antenna element not overlapping with the other sub-array in the pair of sub-arrays B1 and B2. In typical embodiments the antenna elements of sub-arrays A1 and A2 are substantially or even completely non-overlapping, and the antenna elements of sub-arrays B1 and B2 are equally substantially or completely non-overlapping. The example embodiments illustrated in FIGS. 5A-C all show completely non-overlapping sub-arrays.

In embodiments, the antenna elements of sub-arrays A1 and A2 together comprise all antenna elements of the first array.

In embodiments, the number of antenna elements in sub-array A1 is equal to the number of antenna elements in sub-array A2.

In embodiments, the antenna elements of sub-arrays B1 and B2 together comprise all antenna elements of the second array.

In embodiments, the number of antenna elements in sub-array B1 is equal to the number of antenna elements in sub-array B2.

The typical example embodiment in FIG. 5A does not have any non-used antenna elements in sub-arrays A1 and A2, nor in sub-arrays B1 and B2. In this embodiment, A1 and A2 together comprise all antenna elements of the first array, and B1 and B2 together comprise all antenna elements of the second array. Furthermore, the number of antenna elements in A1 is equal to the number of antenna elements in A2, and the number of antenna elements in B1 is equal to the number of antenna elements in B2.

In embodiments, the antenna elements of the first and second arrays are arranged as one single antenna array panel or as a plurality of separate antenna array panels.

In embodiments, one or more of the sub-arrays A1, A2, B1, and B2 are separate antenna array panels.

In embodiments, the first array has the same number of antenna elements as the second array.

In embodiments, first signal x1 and second signal x2 are single-carrier signals.

In embodiments, array size invariant beamforming forms beams that are invariant of the number of antenna elements used for the beamforming.

FIG. 7A is a block diagram illustrating an example wireless node 760, according to certain embodiments. The wireless node 760 is configured to transmit a first signal x1 and a second signal x2 in a wireless communication system using a first array of antenna elements of a polarization A, 765A, and a second array of antenna elements of a polarization B, 765B. Polarization B is substantially orthogonal to the polarization A, and a power pattern of the antenna elements of the first array is substantially the same as a power pattern of the antenna elements of the second array. The wireless node is configured to transmit the first signal x1 in a first beam generated with array size invariant beamforming, using a sub-array A1 of antenna elements from the first array and applying a first precoding matrix, and using a sub-array B1 of antenna elements from the second array and applying a second precoding matrix. The wireless node is further configured to transmit the second signal x2 in a second beam generated with array size invariant beamforming wherein the second beam has a polarization substantially orthogonal to the polarization of the first beam, using a sub-array A2 of antenna elements from the first array and applying a third precoding matrix, and using a sub-array B2 of antenna elements from the second array and applying a fourth precoding matrix. The sub-arrays A1 and A2 each comprises at least one antenna element not overlapping with the other sub-array in the pair of sub-arrays A1 and A2, and the sub-arrays B1 and B2 each comprises at least one antenna element not overlapping with the other sub-array in the pair of sub-arrays B1 and B2. In typical embodiments the antenna elements of sub-arrays A1 and A2 are substantially or even completely non-overlapping, and the antenna elements of sub-arrays B1 and B2 are equally substantially or completely non-overlapping.

In embodiments, the antenna elements of sub-arrays A1 and A2 together comprise all antenna elements of the first array.

In embodiments, the number of antenna elements in sub-array A1 is equal to the number of antenna elements in sub-array A2.

In embodiments, the antenna elements of sub-arrays B1 and B2 together comprise all antenna elements of the second array.

In embodiments, the number of antenna elements in sub-array B1 is equal to the number of antenna elements in sub-array B2.

In embodiments, the antenna elements of the first and second arrays are arranged as one single antenna array panel or as a plurality of separate antenna array panels.

In embodiments, one or more of the sub-arrays A1, A2, B1, and B2 are separate antenna array panels.

In embodiments, the first array has the same number of antenna elements as the second array.

In embodiments, first signal x1 and second signal x2 are single-carrier signals.

In embodiments, array size invariant beamforming forms beams that are invariant of the number of antenna elements used for the beamforming.

The wireless node 760 may in embodiments be configured for operation in a wireless communication system, and may comprise communication interface circuitry 761 configured to communicate with another wireless node such as a UE, and processing circuitry 763 operably coupled with the communication interface circuitry 761, whereby the processing circuitry 763 and the communication interface circuitry are configured to perform the following operations: transmit a first signal x1 and a second signal x2 using a first array of antenna elements of a polarization A and a second array of antenna elements of a polarization B, wherein polarization B is substantially orthogonal to the polarization A, and a power pattern of the antenna elements of the first array is substantially the same as a power pattern of the antenna elements of the second array; transmit the first signal x1 in a first beam generated with array size invariant beamforming, using a sub-array A1 of antenna elements from the first array and applying a first precoding matrix, and using a sub-array B1 of antenna elements from the second array and applying a second precoding matrix; transmit the second signal x2 in a second beam generated with array size invariant beamforming wherein the second beam has a polarization substantially orthogonal to the polarization of the first beam, using a sub-array A2 of antenna elements from the first array and applying a third precoding matrix, and using a sub-array B2 of antenna elements from the second array and applying a fourth precoding matrix. The sub-arrays A1 and A2 each comprises at least one antenna element not overlapping with the other sub-array in the pair of sub-arrays A1 and A2, and the sub-arrays B1 and B2 each comprises at least one antenna element not overlapping with the other sub-array in the pair of sub-arrays B1 and B2. Although FIG. 7A pictures the arrays of antenna elements of a polarization A and B, 765A and 765B, separate from the wireless node 760, the wireless node may in embodiments be said to comprise the antenna arrays organized in one or more antenna array panels.

Figure 7B:
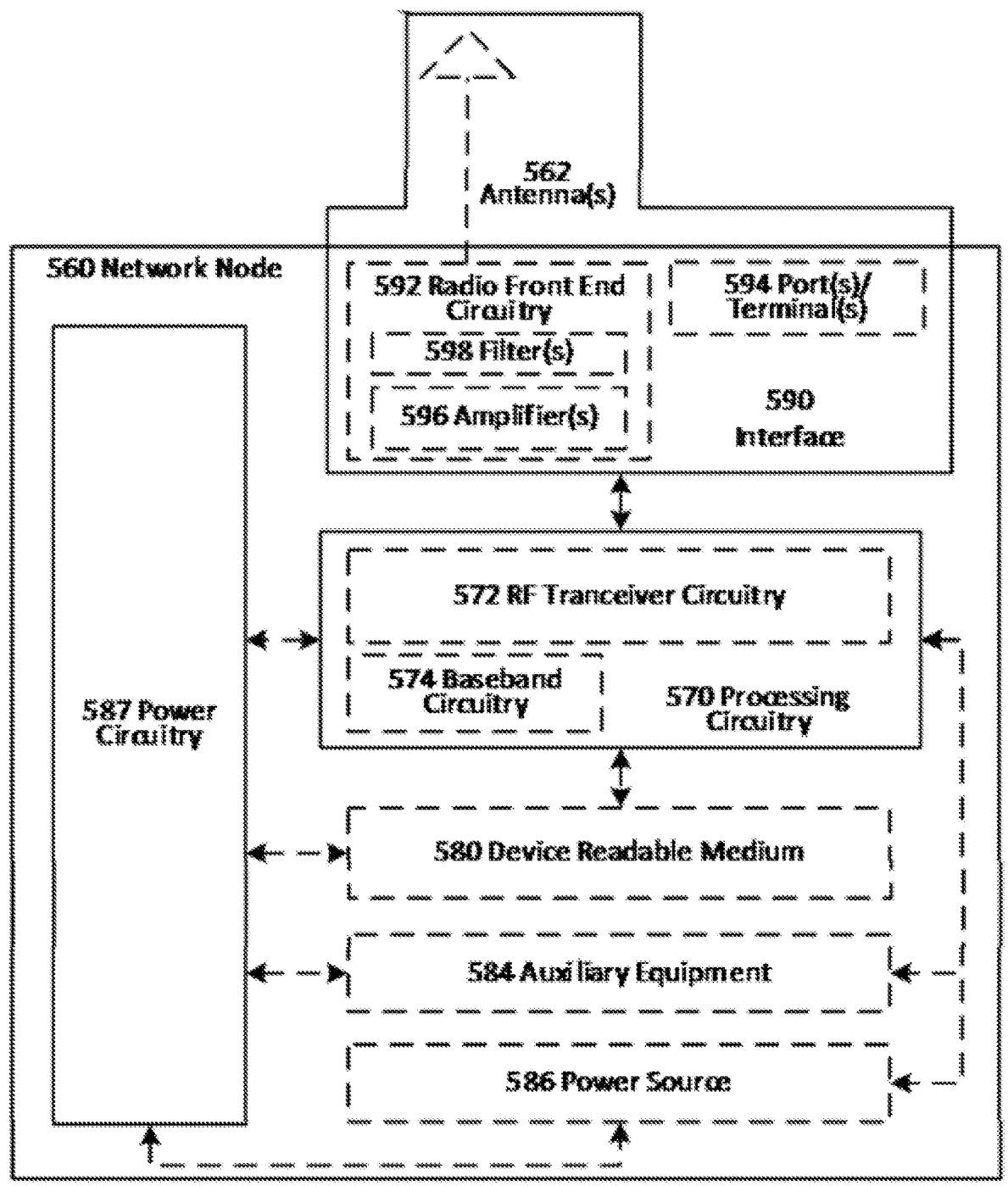

FIG. 7B is a block diagram illustrating an example network node 560 according to certain embodiments. In one embodiment, the network node 560 corresponds to the network node 1060 of FIG. 3. In one embodiment, the wireless node 760 of FIG. 7A corresponds to the network node 560. As used herein, network node refers to equipment capable, configured, arranged and/or operable to communicate directly or indirectly with a wireless device and/or with other network nodes or equipment in the wireless communications system to enable and/or provide wireless access to the wireless device and/or to perform other functions (e.g., administration) in the wireless communications system. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

In FIG. 7B, the network node 560 includes processing circuitry 570, device readable medium 580, interface 590, auxiliary equipment 584, power source 586, power circuitry 587, and antenna 562. Although the network node 1060 illustrated in the example wireless communications system 300 of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of the network node 560 are depicted as single boxes located within a larger box, or nested within multiple boxes, in practice, a network node may comprise multiple different physical components that make up a single illustrated component (e.g., device readable medium 580 may comprise multiple separate hard drives as well as multiple RAM modules).

Similarly, the network node 560 may be composed of multiple physically separate components (e.g., a NodeB component and a RNC component, or a BTS component and a BSC component, etc.), which may each have their own respective components. In certain scenarios in which the network node 560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 560 may be configured to support multiple radio access technologies (RATs). In such embodiments, some components may be duplicated (e.g., separate device readable medium 580 for the different RATs) and some components may be reused (e.g., the same antenna 562 may be shared by the RATs). The network node 560 may also include multiple sets of the various illustrated components for different wireless technologies integrated into the network node 560, such as, for example, GSM, Wide Code Division Multiplexing Access (WCDMA), LTE, NR, WiFi, or Bluetooth wireless technologies. These wireless technologies may be integrated into the same or different chip or set of chips and other components within the network node 560.

The processing circuitry 570 is configured to perform any operations described herein as being provided by a network node or wireless node. The processing circuitry 570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide—either alone or in conjunction with other network node 560 components such as a device readable medium 580—network node 560 functionality. For example, processing circuitry 570 may execute instructions stored in device readable medium 580 or in memory within processing circuitry 570. Such functionality may include providing any of the various wireless features, functions, or benefits discussed herein. In some embodiments, processing circuitry 570 may include a system on a chip (SOC).

In some embodiments, processing circuitry 570 may include one or more of radio frequency (RF) transceiver circuitry 572 and baseband processing circuitry 574. In some embodiments, RF transceiver circuitry 572 and baseband processing circuitry 574 may be on separate chips (or sets of chips), boards, or units, such as radio units and digital units. In alternative embodiments, part or all of RF transceiver circuitry 572 and baseband processing circuitry 574 may be on the same chip or set of chips, boards, or units.

In certain embodiments, some or all of the functionality described herein as being provided by a wireless node, may be performed by processing circuitry 570 executing instructions stored on device readable medium 580 or memory within processing circuitry 570. In alternative embodiments, some or all of the functionality may be provided by processing circuitry 570 without executing instructions stored on a separate or discrete device readable medium, such as in a hard-wired manner. In any of those embodiments, whether executing instructions stored on a device readable storage medium or not, processing circuitry 570 can be configured to perform the described functionality. The benefits provided by such functionality are not limited to processing circuitry 570 alone or to other components of network node 560 but are enjoyed by the network node 560 as a whole, and/or by end users and the wireless communications system generally.

Device readable medium 580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 570. Device readable medium 580 may store any suitable instructions, data or information, including a computer program, software, an application including one or more of logic, rules, code, tables, etc. and/or other instructions capable of being executed by processing circuitry 570 and, utilized by network node 560. Device readable medium 580 may be used to store any calculations made by processing circuitry 570 and/or any data received via interface 590. In some embodiments, processing circuitry 570 and device readable medium 580 may be considered to be integrated.

Interface 590 is used in the wired or wireless communication of signaling and/or data between network node 560/1060, network 1006, and/or wireless devices 1010. As illustrated, interface 590 comprises port(s)/terminal(s) 594 to send and receive data, for example to and from network 506 over a wired connection. Interface 590 also includes radio front end circuitry 592 that may be coupled to, or in certain embodiments a part of, antenna 562. Radio front end circuitry 592 comprises filters 598 and power amplifiers 596. Radio front end circuitry 592 may be connected to antenna 562 and processing circuitry 570. Radio front end circuitry may be configured to condition signals communicated between antenna 562 and processing circuitry 570. Radio front end circuitry 592 may receive digital data that is to be sent out to other network nodes or wireless devices via a wireless connection. Radio front end circuitry 592 may convert the digital data into a radio signal having the appropriate channel and bandwidth parameters using a combination of filters 598 and/or power amplifiers 596. The radio signal may then be transmitted via antenna 562. Similarly, when receiving data, antenna 562 may collect radio signals which are then converted into digital data by radio front end circuitry 592. The digital data may be passed to processing circuitry 570. In other embodiments, the interface may comprise different components and/or different combinations of components.

In certain alternative embodiments, network node 560 may not include separate radio front end circuitry 592, instead, processing circuitry 570 may comprise radio front end circuitry and may be connected to antenna 562 without separate radio front end circuitry 592. Similarly, in some embodiments, all or some of RF transceiver circuitry 572 may be considered a part of interface 590. In still other embodiments, interface 590 may include one or more ports or terminals 594, radio front end circuitry 592, and RF transceiver circuitry 572, as part of a radio unit (not shown), and interface 590 may communicate with baseband processing circuitry 574, which is part of a digital unit (not shown).

Antenna 562 may include one or more antennas, or antenna arrays, configured to send and/or receive wireless signals as described herein. Antenna 562 may be coupled to radio front end circuitry 592 and may be any type of antenna capable of transmitting and receiving data and/or signals wirelessly. In some embodiments, antenna 562 may comprise dual-polarized antennas as described herein. In some instances, the use of more than one antenna may be referred to as Multiple Input Multiple Output (MIMO). In certain embodiments, antenna 562 may be separate from network node 560 and may be connectable to network node 560 through an interface or port.

Antenna 562, interface 590, and/or processing circuitry 570 may be configured to perform any transmitting operations described herein as being performed by a wireless node. Any information, data and/or signals may be transmitted to a wireless device, another network node and/or any other network equipment.

Power circuitry 587 may comprise, or be coupled to, power management circuitry and is configured to supply the components of network node 560 with power for performing the functionality described herein. Power circuitry 587 may receive power from power source 586. Power source 586 and/or power circuitry 587 may be configured to provide power to the various components of network node 560 in a form suitable for the respective components (e.g., at a voltage and current level needed for each respective component). Power source 586 may either be included in, or external to, power circuitry 587 and/or network node 560. For example, network node 560 may be connectable to an external power source (e.g., an electricity outlet) via an input circuitry or interface such as an electrical cable, whereby the external power source supplies power to power circuitry 587. As a further example, power source 586 may comprise a source of power in the form of a battery or battery pack which is connected to, or integrated in, power circuitry 587. The battery may provide backup power should the external power source fail. Other types of power sources, such as photovoltaic devices, may also be used.

Although various embodiments are described herein in terms of methods, apparatus, and computer readable medium, the person of ordinary skill will readily comprehend that such methods can be embodied by various combinations of hardware and software in various systems, communication devices, computing devices, control devices, apparatuses, and non-transitory computer-readable media, etc.

Notably, modifications and other embodiments of the disclosed embodiments will come to mind to one skilled in the art having the benefit of the teachings presented in the foregoing descriptions and the associated drawings. Therefore, it is to be understood that the scope of the disclosure is not to be limited to the specific embodiments disclosed and that modifications and other variants are intended to be included within the scope. Although specific terms can be employed herein, they are used in a generic and descriptive sense only and not for purposes of limitation.

The invention claimed is:

1. A method performed by a wireless node of a wireless communication system for transmitting a first signal x1 and a second signal x2 using a first array of antenna elements of a polarization A and a second array of antenna elements of a polarization B substantially orthogonal to the polarization A, a power pattern of the antenna elements of the first array being substantially the same as identical to a power pattern of the antenna elements of the second array, the method comprising:
   transmitting the first signal x1 in a first beam generated with array size invariant beamforming, using a sub-array A1 of antenna elements from the first array and applying a first precoding matrix, and using a sub-array B1 of antenna elements from the second array and applying a second precoding matrix;
   transmitting the second signal x2 in a second beam generated with array size invariant beamforming, the second beam having a polarization substantially orthogonal to a polarization of the first beam, using a sub-array A2 of antenna elements from the first array and applying a third precoding matrix, and using a sub-array B2 of antenna elements from the second array and applying a fourth precoding matrix; and
   a first pair comprising the sub-arrays A1 and A2, each of the sub-arrays A1 and A2 comprising at least one antenna element not overlapping another sub-array in the first pair, and a second pair comprising the sub-arrays B1 and B2, each of the sub-arrays B1 and B2 comprising at least one antenna element not overlapping another sub-array in the second pair.

2. The method according to claim 1, wherein the antenna elements of sub-arrays A1 and A2 are substantially or completely non-overlapping, and the antenna elements of sub-arrays B1 and B2 are equally substantially or completely non-overlapping.

3. The method according to claim 1, wherein the antenna elements of sub-arrays A1 and A2 together comprise all antenna elements of the first array.

4. The method according to claim 1, wherein a number of antenna elements in sub-array A1 is equal to a number of antenna elements in sub-array A2.

5. The method according to claim 1, wherein the antenna elements of sub-arrays B1 and B2 together comprise all antenna elements of the second array.

6. The method according to claim 1, wherein a number of antenna elements in sub-array B1 is equal to a number of antenna elements in sub-array B2.

7. The method according to claim 1, wherein the antenna elements of the first and second arrays are arranged as one single antenna array panel or as a plurality of separate antenna array panels.

8. The method according to claim 1, wherein one or more of the sub-arrays A1, A2, B1, and B2 are separate antenna array panels.

9. The method according to claim 1, wherein the first array has a same number of antenna elements as the second array.

10. The method according to claim 1, wherein first signal x1 and second signal x2 are single-carrier signals.

11. The method according to claim 1, wherein array size invariant beamforming forms beams that are invariant of a number of antenna elements used for the beamforming.

12. A wireless node configured for operation in a wireless communication system, the wireless node comprising communication interface circuitry configured to communicate with another wireless node, and processing circuitry operably coupled with the communication interface circuitry, the processing circuitry and the communication interface circuitry being configured to:
   transmit a first signal x1 and a second signal x2 using a first array of antenna elements of a polarization A and a second array of antenna elements of a polarization B substantially orthogonal to the polarization A, a power pattern of the antenna elements of the first array being substantially identical to a power pattern of the antenna elements of the second array;
   transmit the first signal x1 in a first beam generated with array size invariant beamforming, using a sub-array A1 of antenna elements from the first array and applying a first precoding matrix, and using a sub-array B1 of antenna elements from the second array and applying a second precoding matrix;
   transmit the second signal x2 in a second beam generated with array size invariant beamforming wherein the second beam has a polarization substantially orthogonal to a polarization of the first beam, using a sub-array A2 of antenna elements from the first array and applying a third precoding matrix, and using a sub-array B2 of antenna elements from the second array and applying a fourth precoding matrix; and
   a first pair comprising the sub-arrays A1 and A2, each of the sub-arrays A1 and A2 comprising at least one antenna element not overlapping another sub-array in the first pair, and a second pair comprising the sub-arrays B1 and B2, each of the sub-arrays B1 and B2 comprising at least one antenna element not overlapping another sub-array in the second pair.

13. The wireless node according to claim 12, wherein the antenna elements of sub-arrays A1 and A2 are substantially or completely non-overlapping, and the antenna elements of sub-arrays B1 and B2 are equally substantially or completely non-overlapping.

14. The wireless node according to claim 12, wherein the antenna elements of sub-arrays A1 and A2 together comprise all antenna elements of the first array.

15. The wireless node according to claim 12, wherein a number of antenna elements in sub-array A1 is equal to a number of antenna elements in sub-array A2.

16. The wireless node according to claim 12, wherein the antenna elements of sub-arrays B1 and B2 together comprise all antenna elements of the second array.

17. The wireless node according to claim 12, wherein a number of antenna elements in sub-array B1 is equal to a number of antenna elements in sub-array B2.

18. The wireless node according to claim 12, wherein the antenna elements of the first and second arrays are arranged as one single antenna array panel or as a plurality of separate antenna array panels.

19. The wireless node according to claim 12, wherein one or more of the sub-arrays A1, A2, B1, and B2 are separate antenna array panels.

20. A non-transitory computer storage medium storing a computer program comprising instructions which, when executed by at least one processor of a wireless node, causes the wireless node to:
   transmit a first signal x1 and a second signal x2 using a first array of antenna elements of a polarization A and a second array of antenna elements of a polarization B substantially orthogonal to the polarization A, a power pattern of the antenna elements of the first array being substantially identical to a power pattern of the antenna elements of the second array;

transmit the first signal x1 in a first beam generated with array size invariant beamforming, using a sub-array A1 of antenna elements from the first array and applying a first precoding matrix, and using a sub-array B1 of antenna elements from the second array and applying a second precoding matrix;

transmit the second signal x2 in a second beam generated with array size invariant beamforming wherein the second beam has a polarization substantially orthogonal to the polarization of the first beam, using a sub-array A2 of antenna elements from the first array and applying a third precoding matrix, and using a sub-array B2 of antenna elements from the second array and applying a fourth precoding matrix; and a first pair comprising the sub-arrays A1 and A2 each of the sub-arrays A1 and A2 comprising at least one antenna element not overlapping another sub-array in the first pair, and a second pair comprising the sub-arrays B1 and B2 each of the sub-arrays B1 and B2 comprising at least one antenna element not overlapping another sub-array in the second pair.

\* \* \* \* \*